March 6, 1951  C. R. AMBERG ET AL  2,544,060
CERAMIC COATING AND METHOD OF APPLYING
Filed Oct. 19, 1945
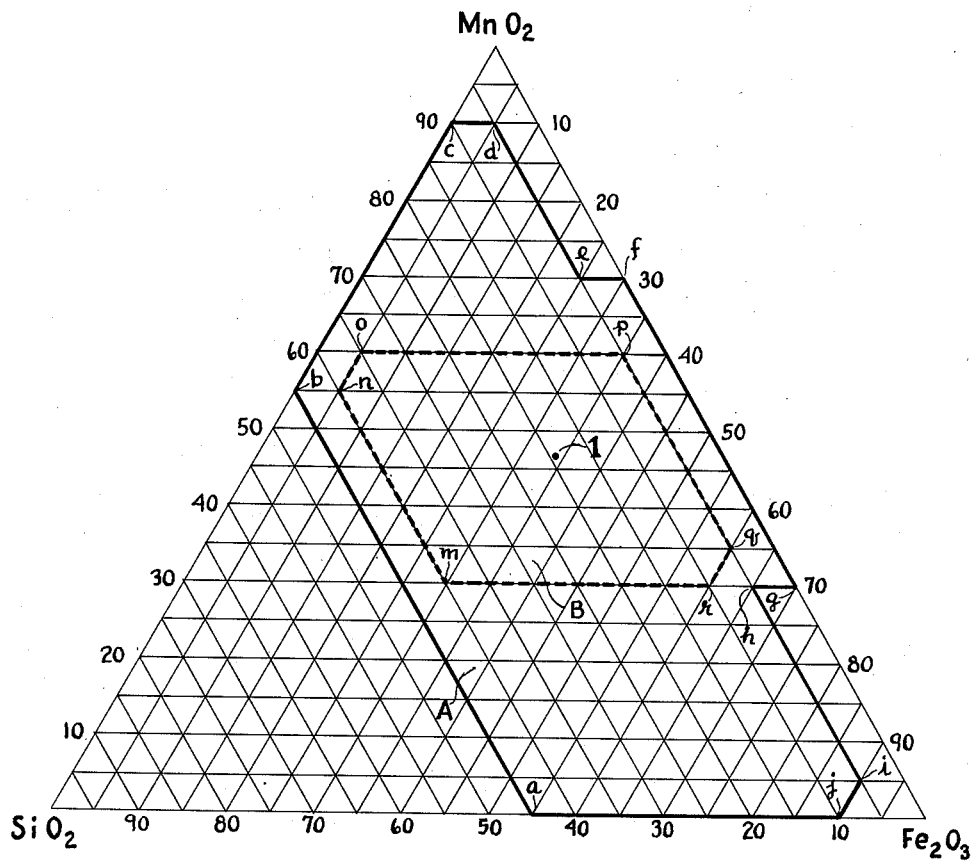
INVENTORS
Charles R. Amberg
Samuel F. Walton
BY Theodore L. Simonton
ATTORNEY Patented Mar. 6, 1951

2,544,060

UNITED STATES PATENT OFFICE 2,544,060

CERAMIC COATINGS AND METHOD OF APPLYING

Charles R. Amberg, Alfred, and Samuel F. Walton, Kenmore, N. Y., assignors to The Exolon Company, Tonawanda, N. Y., a corporation of Massachusetts Application October 19, 1945, Serial No. 623,282

20 Claims. (Cl. 106—44)

This invention relates to ceramic coatings, and relates more particularly to compositions for and methods of producing ceramic coatings containing iron silicate or manganese silicate or both, for use as glazes and bonds for the refractory grains of refractory and abrasive articles.

The refractory and abrasive articles to which this invention relates share the characteristic that their chief constituents are grains of refractory material. The refractory grains used in the refractory and abrasive articles of the types referred to in this specification are graphite, silicon carbide and fused alumina. The term "graphite" is used herein as including not only natural, crystalline graphite, but also artificial graphite, whether or not crystalline in the ordinary sense, and the term "carbon" is used herein to mean non-graphitic, so-called amorphous carbon. Ceramic coatings are used with these refractory grains either as glazes or as bonds. A ceramic glaze coats the surfaces of the refractory grains located at or near the exterior surfaces of the article and serves to protect them from outside influences, and, where the bond is easily destructible as in the case of a carbon bond, serves also to protect the bond. A ceramic bond coats the surfaces of the refractory grains composing the body of the article and serves to join or bond the grains together to form the article. The term ceramic coatings is used herein to include both ceramic glazes and ceramic bonds.

Alumino-silicate ceramic coatings are widely used for refractory and abrasive articles. To a lesser extent, use has been made of ferro-silicate, manganese silicate and ferro-manganese silicate ceramic coatings for such articles, either alone or in combination with alumino-silicates. Doidge Patent 1,868,631, issued July 26, 1932, and Buck Patent 2,013,625, issued September 3, 1935, disclose the use of ceramic coatings containing iron or manganese or both. In both of these patents, and, so far as we are aware, in all successful efforts, prior to this invention, to use iron and manganese silicates in such ceramic coatings, the iron, the manganese and at least part of the silicon have been added to the mix from which the body of the article is to be made, in the form of powdered metals or metal alloys. Attempts have been made to use the oxides of these metals, which would be desirable because of their cheapness and the fine state of subdivision in which they can be commercially obtained, but these attempts have met with no commercial success, probably because the fluffy nature of the iron and manganese oxides results in undesirable physical properties of the final articles.

We have discovered that by using iron and silicon or manganese and silicon or iron and manganese with or without silicon, in the form of a suboxide frit as that term is hereinafter defined, we can produce ceramic coatings of excellent characteristics on the refractory grains of refractory and abrasive articles. The articles so made are of decidedly superior quality. As raw materials for making such frits, we prefer to use the cheap and readily available powdered oxides of these metals. The frit may be added to the body mix as in the prior practices of using the metals themselves, and the mix may be formed and burned in the usual manner. During the firing, the frit fuses and takes up silica or aluminum silicates or both from the normal constituents of the body mix, forming a silicate melt which, upon solidification, becomes the ceramic coating.

Graphite, carbon and silicon carbide are notoriously difficult to wet with molten or partially molten silicates, such as are used to form our ceramic coatings. This is due to the high surface tension of such silicate melts. The effectiveness of such ceramic coatings depends upon the ease and completeness with which, in such molten or partially molten condition, they wet the surfaces to be glazed or bonded. We therefore prefer to use with our frits, as an extremely desirable but not essential addition, a wetting agent adapted, during fusion of the frit to form the coating, to dissolve in the resulting silicate melt and to lower the surface tension of the silicate melt with respect to the surfaces to be wet. While fused alumina is not so difficult to wet, the use of such a wetting agent is helpful even with this refractory. As such a wetting agent, we have successfully employed molybdenum, added to the frit in the form of powdered ferro-molybdenum.

The use of such a wetting agent in ceramic glazes and bonds is disclosed and claimed in a prior application of Charles R. Amberg and Harold C. Harrison, now Patent No. 2,422,215, issued June 17, 1947. That patent also discloses the use of tungsten, vanadium or uranium in place of molybdenum. Precisely as disclosed in that patent, we have found that tungsten is substantially as effective in the practice of the present invention as molybdenum, and that vanadium, although showing some increase of wetting action, is distinctly less advantageous than either molybdenum or tungsten. Uranium we have been unable to try, because it is presently unavailable, but presumably it would work better than vanadium but less well than tungsten, as described in Patent 2,422,215.

The principal object of this invention is to provide improved ceramic coatings containing iron silicate or manganese silicate or both, for use as glazes and bonds for refractory and abrasive articles composed of grains of refractory material.

Another object of our invention is to produce such ceramic coatings using as starting materials oxides or other compounds of iron, manganese and silicon, rather than these metals.

Other objects and advantages of this invention will be apparent from the following specification, taken in conjunction with the accompanying drawing, in which the single figure is a triaxial diagram showing the composition of frits made in accordance with the present invention.

In making our frits, we prefer to use as starting materials commercially available, finely divided oxides of the metals manganese, iron and silicon, for example, manganese dioxide, black iron oxide, and flint. These commercial materials usually contain small percentages of alumina as an impurity, and smaller percentages of other common impurities, all of which may be tolerated in the frit. However, any starting materials may be used which are capable of supplying equivalent amounts of manganese, iron and silicon in the oxide form, such as other oxides or carbonates or silicates of iron and manganese. The powdered starting materials are mixed, and then melted in a suitable crucible or the like. We preferably add before melting a small proportion of a reducing agent such as powdered carbon or graphite, for example, 3½ parts of oil coke to 100 parts of the oxide mixture. This reducing addition may be dispensed with when the oxides are melted in a graphite crucible. The mixture is heated until it becomes sufficiently fluid to pour, and is then poured into water to solidify the frit and shatter it into comparatively small particles that may readily be pulverized in a ball mill without preliminary crushing. The quenched frit is then dried, and pulverized in a ball mill or the like.

On the triaxial diagram, the larger area A enclosed by the solid line defines the compositions of frits which are usable in accordance with this invention. The smaller area B enclosed by the broken line defines the preferred range of such compositions. The three corner points of the triaxial diagram are marked $SiO_2$, $MnO_2$ and $Fe_2O_3$, respectively, and, in accordance with the usual practice, represent 100 percent of the oxide named with none of the other two oxides. All other points on the triangle represent varying proportions of the three oxides as determined by the coordinates of the point in question in the usual manner.

Both the areas A and B are polygons which may be defined by locating their respective vertices, points $a$ through $j$, inclusive, being the vertices of area A, and points $m$ through $r$, inclusive, being the vertices of area B. The locations of these points, in terms of the percentages of $SiO_2$, $MnO_2$ and $Fe_2O_3$, are as follows:

| Point | Percent $SiO_2$ | Percent $MnO_2$ | Percent $Fe_2O_3$ |
|---|---|---|---|
| a | 45 | 0 | 55 |
| b | 45 | 55 | 0 |
| c | 10 | 90 | 0 |
| d | 5 | 90 | 5 |
| e | 5 | 70 | 25 |
| f | 0 | 70 | 30 |
| g | 0 | 30 | 70 |
| h | 5 | 30 | 65 |
| i | 5 | 5 | 90 |
| j | 10 | 0 | 90 |
| m | 40 | 30 | 30 |
| n | 40 | 55 | 5 |
| o | 35 | 60 | 5 |
| p | 5 | 60 | 35 |
| q | 5 | 35 | 60 |
| r | 10 | 30 | 60 |

It will be observed that the composition of the frit is susceptible to considerable change. Although we prefer to keep the frit composition within the area B on the accompanying triaxial diagram, frit compositions lying anywhere within the area A can be melted at a reasonable temperature and poured, and will make acceptable glazes and bonds. It will be noted that the upper limit of silica in the area A is 45%. If a larger proportion of silica than 45% is attempted to be used, the result is a mixture which is too refractory to be melted and poured to form a frit as above described. It would normally be expected that the addition of fluxing materials such as feldspar and borax would reduce the refractoriness of the frit. We have ascertained the fact, however, to be quite the contrary; such fluxing materials tend, instead, to increase the refractoriness of the frit.

During the manufacture of the frit as above described, various reactions occur, depending upon the nature and proportions of the starting materials. Thus, manganese dioxide readily loses oxygen on heating, and carbonates, if used, are converted into oxides. Moreover, ferric oxide is reduced, at least in part, to lower oxides of iron. The resulting oxides of manganese and iron combine with each other and with silica. It is not important exactly how much of the iron and manganese are reduced to lower oxides. What is important is to remove during the manufacture of the frit, all loosely combined or excess oxygen which might otherwise be available later as a source of oxygen to oxidize the refractory grain or the carbon bond with which the frit may ultimately be used. This object is accomplished by either the addition of powdered carbon to the frit batch or the use of a graphite crucible to melt the frit, as above described, and results in the production of a frit which contains substantially less oxygen than would correspond to the oxides $SiO_2$, $MnO_2$ and $Fe_2O_3$. Such a low oxygen frit we shall herein term a suboxide frit.

It will be evident from the foregoing that the triaxial diagram does not represent the actual composition of the finished frit. It does, however, correctly represent the materials in the batch from which the frit is made, when the oxides specified, namely $MnO_2$, $Fe_2O_3$ and $SiO_2$, are used as the starting materials, and which may be called the batch composition of the frit. The triaxial diagram also correctly represents the proportions of the three metals, manganese, iron and silicon, in the finished frit when these metals are calculated as the oxides $MnO_2$, $Fe_2O_3$ and $SiO_2$, respectively. However, as stated above, the oxygen content of the finished frit is substantially less than would correspond to said oxides.

It will be noted that the center of the area B is a point corresponding to a batch frit composition, as that term is above defined, of 45 percent $MnO_2$, 32½ percent $Fe_2O_3$, and 22½ percent $SiO_2$. We have found compositions in the general vicinity of this center point to be highly desirable. Thus, the point marked I on the triaxial diagram defines a frit which we have used with marked success, and which we will hereinafter call frit I. The manganese, iron and silicon contents of frit I, when calculated as $MnO_2$, $Fe_2O_3$ and $SiO_2$, respectively, give a percentage composition for frit I, as shown on the triaxial diagram, of 47 percent $MnO_2$, 34 percent $Fe_2O_3$, and 19 percent $SiO_2$. The particular commercial starting materials which we have successfully employed in making our frits, were used in the following proportions in the batch to produce this frit I:

| | Per cent |
|---|---|
| Commercial manganese dioxide (MnO$_2$) | 51.2 |
| Commercial black iron oxide (Fe$_3$O$_4$) | 33.2 |
| Commercial powdered flint (SiO$_2$) | 15.6 |
| Total | 100.0 |

As pointed out above, during use of the frit to make ceramic coatings for refractory and abrasive articles, the frit fuses and takes up silica or aluminum silicates or both from the normal constituents of the body mix with which it is employed. The silicate melt thus becomes more refractory, and produces extremely refractory ceramic coatings on the refractory grains. Probably because of their refractoriness, these ceramic coatings have proved to be especially desirable glazes and bonds. Also, the protective glaze or bond initially formed progressively increases in refractoriness in high temperature service as the ceramic coatings take up silica or alumina derived from the constituents normally present in the refractory body. It would be expected that the addition of silica would increase the refractoriness of the melts, but that aluminum silicates do so is indeed a surprising result.

Where molybdenum is to be used as a wetting agent with the frit, we prefer to add powdered ferro-molybdenum, conveniently of the commercially available 100 mesh size, to the ball mill in which the frit is to be pulverized, and thus grind it with the frit. Varyng proportions of ferro-molybdenum may be added, depending upon the use to which the frit is to be put. With ferro-molybdenum containing 60 percent molybdenum, we have found it desirable to add from 2 to 4 percent of ferro-molybdenum based on the frit, when the frit is to be used in connection with graphite and silicon carbide refractory articles, and from 7 to 10 percent when the frit is to be used with silicon carbide abrasive articles. If no molybdenum is used with graphite and silicon carbide refractories and abrasives, the ceramic coatings produced, although usable, are decidedly inferior to those produced with the foregoing quantities of molybdenum. The use of a wetting agent such as molybdenum is therefore practically essential in these cases. In the case of fused alumina abrasives, on the other hand, the ceramic coatings produced without any molybdenum are nearly equal in quality to those produced with it, and, therefore, no molybdenum need be added to the frit for this use. We prefer, however, to add at least 2 percent of ferro-molybdenum to the frit even when it is to be used with fused alumina abrasives.

The foregoing range of ferro-molybdenum, from 2 to 10 percent, corresponds to from 1.2 to 6 percent of molybdenum based on the weight of the frit itself. Larger quantities of molybdenum are undesirable principally from the standpoint of cost, and smaller quantities, although producing some desirable effects, are not adequate for best results. When the molybdenum-containing frit is used as described below, the molybdenum is converted into molybdenum oxide, which dissolves in the resulting silicate melt and reduces its surface tension. Although we prefer to use ferro-molybdenum, the molybdenum wetting agent may be added to the frit as the oxide or as metallic molybdenum, or as a salt which upon heating is converted into the oxide, such as ammonium molybdate.

After considerable experimentation, we have found it convenient to standardize on two proportions of ferro-molybdenum. One mixture, which we shall call herein frit II, consists of 97.43% of frit I and 2.57% of ferro-molybdenum containing 60 percent molybdenum. Frit II is especially intended for use with graphite and silicon carbide refractory articles. The other mixture, which we shall call herein frit III, consists of 91.29% of frit I and 8.71% of the same ferro-molybdenum. Frit III is especially intended for use with silicon carbide abrasive articles.

We shall now give examples of the use of these frits in the manufacture of various refractory and abrasive articles. It will be understood that these examples are purely illustrative, and that considerable variation in the compositions is possible.

One type of refractory article in which our invention has demonstrated its usefulness is the well-known carbon bonded graphite crucible. Such crucibles must be self-glazing, that is to say, capable of reglazing any chipped portions in service, because the carbon bond is so much more easily oxidized than the graphite and other ingredients of the body, that exposure of any unglazed portions to an oxidizing atmosphere at high temperature would soon result in a weakened crucible due to loss of the carbon bond by oxidation. As stated above, we prefer to use frit II in the manufacture of such crucibles. The refractory mix for the crucible body may be conventional, except for the glaze-forming ingredients. Two practical formulas are as follows, in parts by weight:

| | I | II |
|---|---|---|
| Madagascar Graphite | 20 | 21.8 |
| Fire Clay Grog | 20 | 21.8 |
| Silicon Carbide Fines | 30 | 32.7 |
| Tar | 7 | 7 |
| Pitch | 13 | 13 |
| Feldspar | | 3.5 |
| Borax | | 1 |
| Frit II | 10 | 10 |

The proportions of the frit II in the above formulas may be varied somewhat but not too widely. Considerable variation is possible in the other ingredients. The feldspar and borax of Formula II may conveniently be added in the form of a frit. The feldspar used in the above and following formulas may be any of the commercially produced feldspars commonly employed by ceramists, all of such commercially produced feldspars being mixtures of soda and potash feldspars.

The foregoing mixes may be formed into crucibles and fired to develop the carbon bond and the glaze in the usual manner. Should the crucible become chipped in service, the glaze-forming constituents present near the new surface will, under the usual conditions of use, speedily develop a new protective surface glaze.

Our invention is also applicable to silicon carbide refractories. One of the principal problems in connection with silicon carbide refractories has always been the tendency of the silicon carbide to oxidize under service conditions. This oxidation in the course of time destroys the refractory article. Also, the oxidation causes a permanent and progressive growth in the dimensions of the refractory article, due to the greater volume of the silica than that of the silicon carbide from which it was formed. This growth in size limits the uses to which these refractories may be put.

Two expedients are presently in common use to restrict this oxidation. One is to make as dense a body as possible, by using a mixture of various sizes of silicon carbide grain and using high forming pressures. The resulting low porosity limits the area of surface open to oxidation attack. The second expedient is the use of a clay bond that vitrifies at the temperature at which the refractory is fire. This gives some further protection from oxidation by partially coating the grains. A third expedient is to apply a glaze over the whole refractory article, but this is not feasible for most uses, such as refractory kiln furniture, because ware set on the glazed refractory would stick to it during the firing.

According to this invention, we may add a small proportion of our frit II to the mix from which the body of the refractory is to be made, the mix being otherwise conventional and comprising silicon carbide grain and the constituents of a vitrifying clay bond. The result is a silicon carbide refractory having a very thin glassy coating on the individual grains of silicon carbide throughout the body, and yet, surprisingly, the refractory has the dry appearance of an unglazed silicon carbide refractory, and ware will not stick to it when the refractory is used as kiln furniture. Tests have shown that silicon carbide refractories so made in accordance with this invention have more than seven times the resistance to oxidation of silicon carbide refractories of similar porosity bonded with a vitrifying clay bond only. This superior resistance to oxidation makes it possible to produce oxdation-resistant silicon carbide refractories of higher porosity than is feasible with present practice. The resulting lighter weight of the refractory article has numerous advantages, such as making the article easier to handle, reducing the quantity of silicon carbide required for an article of a given size, and, for kiln furniture, saving fuel because of the smaller mass of refractory material that need be heated.

A suitable formula for making such silicon carbide refractories is as follows, in parts by weight:

Mixed silicon carbide grain_____ 91
Vitrifying ball clay_____ 8
Goulac _____ 1
Frit II _____ 0.75

The Goulac mentioned above is a sulphite liquor pitch, used as a temporary binder. The refractory mix may be formed and burned in the usual manner. It will be understood that considerable variation is possible in the proportions of the various ingredients.

As stated above, the product is a superior silicon carbide refractory having an unusually high resistance to oxidation. The individual grains of silicon carbide in the body are coated with a microscopically thin ceramic coating which serves both to bond the grains together and as a glaze to protect them from oxidation. While this coating appears glassy under the microscope, it does not act as one would normally expect a glassy bonding material to act. One would expect a glass bonded material to stick to ware set on it at high temperatures, and would also expect the refractory to warp easily and to fail under load at high temperatures. On the contrary, the refractory above described does not stick to ware, shows comparatively little warping and loss of strength at high temperatures, and shows a resistance to oxidation far greater than would normally be expected from the use of a glassy bond. We believe that these valuable properties are due in considerable part to the very refractory nature of the ceramic coating.

Still another field of use for our frits lies in the manufacture of clay bonded silicon carbide abrasive articles, such as abrasive wheels. Here it is convenient to mix the bond separately, then incorporate the desired amount of the bond with the abrasive grain to make the body mix, and then form and burn the abrasive article in the usual manner. Abrasive wheels of exceptional strength and hardness have been made using 19 percent of the following bond in the body mix:

|  | Per cent |
|---|---|
| Feldspar | 72.5 |
| Ball clay | 25.0 |
| Frit III | 2.5 |
| Total | 100.0 |

Tests of abrasive wheels thus made have shown that the individual abrasive grains tend to fracture in service, rather than, as is usually the case, simply being torn bodily out of the wheel. In other words, when fractured, the breaks occur principally across the grain and the bond, rather than at the interface between the grain and the bond. The former is the ideal condition because, as such a wheel wears down in service, the fractured grains constantly present new cutting surfaces. If the grain tears out of the bond as a whole grain, the wheel wears away more rapidly without accomplishing as much work.

The foregoing desirable result may be ascribed both to the strength of the bond and to the thoroughness with which the bond, with its relatively high molybdenum content, wets the grain surfaces. The presence of this wetting may be easily demonstrated. If a small amount of the above bond is melted in a porcelain cup or the like, it will shows a concave meniscus, and this concave meniscus is obtained without over-firing or bloating. A concave meniscus is a characteristic of an ideal bond, whereas the conventional clay bonds presently used for silicon carbide abrasive wheels show a convex meniscus under the same conditions. The difference is visible in the wheel itself under a microscope. In a conventional wheel, the bond exhibits a tendency to draw in on itself and leave the surface of the grain, whereas in our new wheel, the bond spreads over the grain surface with a typical appearance of wetting.

For fused alumina abrasive, the bond may comprise 2.5 percent by weight of frit I and 97.5 percent of a conventional bond such as one consisting of equal parts by weight of Albany slip clay and of ball clay. Frit I may be used, because fused alumina is relatively easy to wet by a silicate melt and hence no molybdenum wetting agent is required. Even with fused alumina, however, we prefer to use some molybdenum, and hence recommend the substitution of frit II for frit I in the above bond formula. The manufacture of the abrasive articles is otherwise conventional.

Our frits can also be used advantageously in producing external glazes on graphite and silicon carbide refractories. All that is necessary is to add a small proportion of frit II to the ingredients of a conventional silicate glaze. Such a glaze may consist of 10 parts of borax, 10 parts of feldspar and 80 parts of ball clay, and to this we add 2 parts of frit II. The glaze is applied to the formed refractory article, either before or after burning, and matured by gloss firing in the usual manner. A greatly improved external glaze is the result.

Although we have thus described our invention in the best forms of which we are aware, it will be evident to those skilled in this art that many changes and modifications other than those which we have specifically mentioned, could be made without departing from the spirit of our invention. It is our desire to be limited, therefore, only by the scope of the appended claims.

We claim:

1. A composition of matter adapted for use in producing ceramic coatings on the refractory grains of refractory and abrasive articles, and comprising a pulverized frit consisting essentially of a reaction product of fused metal oxides, the principal metals contained in said frit being present in such proportions as to be represented, when computed as their oxides $SiO_2$, $MnO_2$ and $Fe_2O_3$, by a point on an $SiO_2$—$MnO_2$—$Fe_2O_3$ triaxial diagram lying within the area enclosed by a polygon the coordinates of the successive vertices of which, naming the oxides in the foregoing order, are: 45–0–55, 45–55–0, 10–90–0, 5–90–5, 5–70–25, 0–70–30, 0–30–70, 5–30–65, 5–5–90, 10–0–90, and the oxygen content of the fritted oxides of said principal metals being substantially less than would correspond to said computed oxides, whereby said frit contains no loosely combined oxygen.

2. A composition of matter as claimed in claim 1, comprising in addition a small proportion of a wetting agent adapted upon subsequent fusion of said frit to reduce the surface tension thereof with respect to said refractory grains.

3. A composition of matter adapted for use in producing ceramic coatings on the refractory grains of refractory and abrasive articles, and comprising a pulverized frit consisting essentially of a reaction product of fused metal oxides, the principal metals contained in said frit being present in such proportions as to be represented, when calculated as their oxides $SiO_2$, $MnO_2$ and $Fe_2O_3$, by a point on an $SiO_2$—$MnO_2$—$Fe_2O_3$ triaxial diagram lying within the area enclosed by a polygon the coordinates of the successive vertices of which, naming the oxides in the foregoing order, are: 40–30–30, 40–55–5, 35–60–5, 5–60–35, 5–35–60, 10–30–60, and the oxygen content of the fritted oxides of said principal metals being substantially less than would correspond to said computed oxides, whereby said frit contains no loosely combined oxygen.

4. A composition of matter as claimed in claim 3, comprising in addition a small proportion of a wetting agent adapted upon subsequent fusion of said frit to reduce the surface tension thereof with respect to said refractory grains.

5. A composition of matter adapted for use in producing ceramic coatings on the refractory grains of refractory and abrasive articles, and comprising a pulverized frit consisting essentially of a reaction product of fused metal oxides, the principal metals contained in said frit being present in such proportions as to be represented, when computed as their oxides $SiO_2$, $MnO_2$ and $Fe_2O_3$, by a point on an $SiO_2$—$MnO_2$—$Fe_2O_3$ triaxial diagram, lying near a point the coordinates of which are 45 percent $MnO_2$, 32.5 percent $Fe_2O_3$ and 22.5 percent $SiO_2$ and the oxygen content of the fritted oxides of said principal metals being substantially less than would correspond to said computed oxides, whereby said frit contains no loosely combined oxygen.

6. A composition of matter as claimed in claim 5, comprising in addition a small proportion of a wetting agent adapted upon subsequent fusion of said frit to reduce the surface tension of the resulting silicate melt with respect to refractory grains of graphite, silicon carbide and fused alumina.

7. A composition of matter as claimed in claim 5, comprising in addition molybdenum present in an amount not less than 1.2 percent nor more than 6 percent based on the other constituents of the composition.

8. A composition of matter adapted for use in producing ceramic coatings on the refractory grains of refractory and abrasive articles, and comprising a pulverized frit consisting essentially of a reaction product of fused oxides of manganese, iron and silicon, which, when computed as $MnO_2$, $Fe_2O_3$ and $SiO_2$, are present approximately in the proportions 47 percent $MnO_2$, 34 percent $Fe_2O_3$ and 19 percent $SiO_2$, and the oxygen content of said fritted oxides being substantially less than would correspond to said computed oxides, whereby said frit contains no loosely combined oxygen.

9. A composition of matter as claimed in claim 8, comprising in addition a small proportion of a wetting agent adapted upon subsequent fusion of said frit to reduce the surface tension of the resulting silicate melt with respect to refractory grains of graphite, silicon carbide and fused alumina.

10. A composition of matter as claimed in claim 8, comprising in addition molybdenum present in an amount not less than 1.2 percent nor more than 6 percent based on the other constituents of the composition.

11. In a method of producing a ceramic coating on refractory grains composing an article, the steps of bringing into contact with said refractory grains a pulverized frit consisting essentially of a reaction product of fused metal oxides, the principal metals contained in said frit being present in such proportions as to be represented, when computed as their oxides $SiO_2$, $MnO_2$ and $Fe_2O_3$, by a point on an $SiO_2$—$MnO_2$—$Fe_2O_3$ triaxial diagram lying within the area enclosed by a polygon the coordinates of the successive vertices of which, naming the oxides in the foregoing order, are: 45–0–55, 45–55–0, 10–90–0, 5–90–5, 5–70–25, 0–70–30, 0–30–70, 5–30–65, 5–5–90, 10–0–90, and the oxygen content of the fritted oxides of said principal metals being substantially less than would correspond to said computed oxides, whereby said frit contains no loosely combined oxygen, and firing the article to fuse said frit on the surfaces of said refractory grains.

12. In a method of producing a ceramic coating on refractory grains composing an article, the steps of bringing into contact with said refractory grains a pulverized frit consisting essentially of a reaction product of fused metal oxides, the principal metals contained in said frit being present in such proportions as to be represented, when computed as their oxides $SiO_2$, $MnO_2$ and $Fe_2O_3$, by a point on an $SiO_2$—$MnO_2$—$Fe_2O_3$ triaxial diagram lying within the area enclosed by a polygon the coordinates of the successive vertices of which, naming the oxides in the foregoing order, are: 40–30–30, 40–55–5, 35–60–5, 5–60–35, 5–35–60, 10–30–60, and the oxygen content of the fritted oxides of said principal metals being substantially less than would correspond to said computed oxides, whereby said frit contains no loosely combined oxygen, and firing the article to fuse said frit on the surfaces of said refractory grains.

13. In a method of producing a ceramic coating on refractory grains composing an article, the steps of bringing into contact with said refractory grains a pulverized frit consisting essentially of a reaction product of fused metal oxides, the principal metals contained in said frit being present in such proportions as to be represented, when computed as their oxides $SiO_2$, $MnO_2$ and $Fe_2O_3$, by a point on an $SiO_2$—$MnO_2$—$Fe_2O_3$ triaxial diagram lying near a point the coordinates of which are 45 percent $MnO_2$, 32.5 percent $Fe_2O_3$ and 22.5 percent $SiO_2$, and the oxygen content of the fritted oxides of said principal metals being substantially less than would correspond to said computed oxides, whereby said frit contains no loosely combined oxygen, and firing the article to fuse said frit on the surfaces of said refractory grains.

14. The method of producing ceramic coatings for refractory and abrasive articles, which comprises preparing a body mix containing grains of a difficultly wettable refractory material of the group consisting of graphite, silicon carbide, fused alumina and mixtures thereof, incorporating in the body mix a small proportion of a pulverized frit consisting essentially of a reaction product of fused metal oxides, the principal metals contained in said frit being present in such proportions as to be represented, when computed as their oxides $SiO_2$, $MnO_2$ and $Fe_2O_3$, by a point on an $SiO_2$—$MnO_2$—$Fe_2O_3$ triaxial diagram lying within the area enclosed by a polygon the coordinates of the successive vertices of which, naming the oxides in the foregoing order, are: 45–0–55, 45–55–0, 10–90–0, 5–90–5, 5–70–25, 0–70–30, 0–30–70, 5–30–65, 5–5–90, 10–0–90, and the oxygen content of the fritted oxides of said principal metals being substantially less than would correspond to said computed oxides, whereby said frit contains no loosely combined oxygen, incorporating in the body mix a considerably smaller proportion of a wetting agent adapted upon subsequent fusion of said frit to reduce the surface tension thereof with respect to the surfaces of said refractory grains, forming the body mix into the desired shape of the article, and firing the article to fuse said frit on the surfaces of said refractory grains.

15. The method of producing ceramic coatings for refractory and abrasive articles, which comprises preparing a body mix containing grains of a difficultly wettable refractory material of the group consisting of graphite, silicon carbide, fused alumina and mixtures thereof, incorporating in the body mix a small proportion of a pulverized frit consisting essentially of a reaction product of fused metal oxides, the principal metals contained in said frit being present in such proportions as to be represented, when computed as their oxides $SiO_2$, $MnO_2$ and $Fe_2O_3$, by a point on an $SiO_2$—$MnO_2$—$Fe_2O_3$ triaxial diagram lying within the area enclosed by a polygon the coordinates of the successive vertices of which, naming the oxides in the foregoing order, are: 40–30–30, 40–55–5, 35–60–5, 5–60–35, 5–35–60, 10–30–60, and the oxygen content of the fritted oxides of said principal metals being substantially less than would correspond to said computed oxides, whereby said frit contains no loosely combined oxygen, incorporating in the body mix a considerably smaller proportion of a wetting agent adapted upon subsequent fusion of said frit to reduce the surface tension thereof with respect to the surfaces of said refractory grains, forming the body mix into the desired shape of the article, and firing the article to fuse said frit on the surfaces of said refractory grains.

16. The method of producing a ceramic glaze for a refractory article, which comprises preparing a body mix containing grains of graphite and materials adapted to produce a carbon bond, incorporating in the body mix a small proportion of a pulverized frit consisting essentially of a reaction product of fused metal oxides, the principal metals contained in said frit being present in such proportions as to be represented, when computed as their oxides $SiO_2$, $MnO_2$ and $Fe_2O_3$, by a point on an $SiO_2$—$MnO_2$—$Fe_2O_3$ triaxial diagram lying within the area enclosed by a polygon the coordinates of the successive vertices of which, naming the oxides in the foregoing order, are: 40–30–30, 40–55–5, 35–60–5, 5–60–35, 5–35–60, 10–30–60, and the oxygen content of the fritted oxides of said principal metals being substantially less than would correspond to said computed oxides, whereby said frit contains no loosely combined oxygen, incorporating in the body mix not less than 1.2 percent nor more than 2.4 percent of molybdenum based on the weight of the frit, forming the body mix into the desired shape of the article, and firing the article to develop the carbon bond and the ceramic glaze.

17. The method of producing a ceramic bond for a refractory article, which comprises preparing a body mix containing grains of silicon carbide and materials adapted to produce a vitrifying clay bond, incorporating in the body mix a small proportion of a pulverized frit consisting essentially of a reaction product of fused metal oxides, the principal metals contained in said frit being present in such proportions as to be represented, when computed as their oxides $SiO_2$, $MnO_2$ and $Fe_2O_3$, by a point on an $$SiO_2\text{—}MnO_2\text{—}Fe_2O_3$$

triaxial diagram lying within the area enclosed by a polygon the coordinates of the successive vertices of which, naming the oxides in the foregoing order, are: 40–30–30, 40–55–5, 35–60–5, 5–60–35, 5–35–60, 10–30–60, and the oxygen content of the fritted oxides of said principal metals being substantially less than would correspond to said computed oxides, whereby said frit contains no loosely combined oxygen, incorporating in the body mix not less than 1.2 percent nor more than 2.4 percent of molybdenum based on the weight of the frit, forming the body mix into the desired shape of the article, and firing the article to develop the ceramic bond.

18. The method of producing a ceramic bond for an abrasive article, which comprises preparing a body mix containing grains of silicon carbide and materials adapted to produce a clay bond, incorporating in the body mix a small proportion of a pulverized frit consisting essentially of a reaction product of fused metal oxides, the principal metals contained in said frit being present in such proportions as to be represented, when computed as their oxides $SiO_2$, $MnO_2$ and $Fe_2O_3$, by a point on an $SiO_2$—$MnO_2$—$Fe_2O_3$ triaxial diagram lying within the area enclosed by a polygon the coordinates of the successive vertices of which, naming the oxides in the foregoing order, are: 40–30–30, 40–55–5, 35–60–5, 5–60–35, 5-35-60, 10-30-60, and the oxygen content of the fritted oxides of said principal metals being substantially less than would correspond to said computed oxides, whereby said frit contains no loosely combined oxygen, incorporating in the body mix not less than 4.2 percent nor more than 6 percent of molybdenum based on the weight of the frit, forming the body mix into the desired shape of the article, and firing the article to develop the ceramic bond.

19. The method of producing a ceramic bond for an abrasive article, which comprises preparing a body mix containing grains of fused alumina and materials adapted to produce a clay bond, incorporating in the body mix a small proportion of a pulverized frit consisting essentially of a reaction product of fused metal oxides, the principal metals contained in said frit being present in such proportions as to be represented, when computed as their oxides $SiO_2$, $MnO_2$ and $Fe_2O_3$, by a point on an $SiO_2$—$MnO_2$—$Fe_2O_3$ triaxial diagram lying within the area enclosed by a polygon the coordinates of the successive vertices of which, naming the oxides in the foregoing order, are: 40-30-30, 40-55-5, 35-60-5, 5-60-35, 5-35-60, 10-30-60, and the oxygen content of the fritted oxides of said principal metals being substantially less than would correspond to said computed oxides, whereby said frit contains no loosely combined oxygen, forming the body mix into the desired shape of the article, and firing the article to develop the ceramic bond.

20. The method of producing an external ceramic glaze on a refractory article, which comprises coating a formed refractory article composed of refractory grains with a glaze-forming mixture containing a small proportion of a pulverized frit consisting essentially of a reaction product of fused metal oxides, the principal metals contained in said frit being present in such proportions as to be represented, when computed as their oxides $SiO_2$, $MnO_2$ and $Fe_2O_3$, by a point on an $SiO_2$—$MnO_2$—$Fe_2O_3$ triaxial diagram lying within the area enclosed by a polygon the coordinates of the successive vertices of which, naming the oxides in the foregoing order, are: 40-30-30, 40-55-5, 35-60-5, 5-60-35, 5-35-60, 10-30-60, and the oxygen content of the fritted oxides of said principal metals being substantially less than would correspond to said computed oxides, whereby said frit contains no loosely combined oxygen, and containing also a considerably smaller proportion of a wetting agent adapted upon subsequent fusion of said frit to reduce the surface tension thereof with respect to the surface of said refractory grains, and firing said coated article to develop the ceramic glaze.

CHARLES R. AMBERG.
SAMUEL F. WALTON.

REFERENCES CITED

The following references are of record in the file of this patent:

UNITED STATES PATENTS

| Number | Name | Date |
|---|---|---|
| Re. 8,855 | Clark | Aug. 19, 1879 |
| Re. 8,995 | Clark | Dec. 16, 1879 |
| 250,465 | Volbrath | Dec. 6, 1881 |
| 596,317 | Bentz | Dec. 28, 1897 |
| 1,332,058 | Musiol | Feb. 24, 1920 |
| 1,633,462 | Sortwell | June 21, 1927 |
| 2,043,559 | Rosenberg | June 9, 1936 |
| 2,058,209 | Bley | Oct. 20, 1936 |
| 2,170,387 | Morgan | Aug. 22, 1939 |
| 2,279,168 | Kalischer et al. | Apr. 7, 1942 |
| 2,337,103 | Heimsoeth | Dec. 21, 1943 |
| 2,364,108 | Swentzel | Dec. 5, 1944 |
| 2,389,386 | Russell | Nov. 20, 1945 |
| 2,391,468 | Long | Dec. 25, 1945 |
| 2,422,215 | Amberg et al. | June 17, 1947 |